United States Patent Office 3,645,927
Patented Feb. 29, 1972

3,645,927
POLYURETHANE CATALYST
Karlheinz Andres, Cologne, Flittard, Franz Karl Brochhagen, Odenthal, Anton Wunderer, Leverkusen, and Josef Fulber, Osnabrueck, Germany, assignors to Farbenfabriken Bayer Aktiengesellschaft, Leverkusen, Germany
No Drawing. Filed May 13, 1969, Ser. No. 824,313
Claims priority, application Germany, May 15, 1968,
P 17 69 367.3
Int. Cl. C08g 22/42, 22/44
U.S. Cl. 260—2.5 AB          4 Claims

ABSTRACT OF THE DISCLOSURE

A catalyst is provided for the production of urethane-containing polymers by the reaction between an organic polyhydroxy compound and an organic polyisocyanate in the presence of a blowing agent wherein di-n-octyl tin mercaptide is used as the activator for the isocyanate/hydroxyl hydrogen reaction.

---

Urethane-containing foam plastics which vary greatly in their physical properties have long been produced on a commercial basis by the isocyanate polyaddition process wherein compounds which contain several hydrogen atoms reactive with NCO groups, and especially polyhydroxyl compounds, are reacted with polyisocyanates, using water and/or other blowing agents, activators and possibly other additives such as emulsifiers and stabilizers having a silicone structure. When such a process is employed it is possible to produce both hard and soft foam plastics and any variations between these extremes by merely choosing the appropriate reactants.

Foam plastics based on polyisocyanates are preferably produced from liquid starting materials which are preferably mixed together simultaneously or, alternatively, a prepolymer containing free NCO groups which may first be prepared by reacting a polyol with an excess of a polyisocyanate is subsequently converted into a foam plastic in a second step using water.

The activator chosen to catalyze the system is of great importance when carrying out this process. In practice it has been found that particularly suitable activators are amine catalysts such as tertiary amines including dimethylbenzylamine and triethylenediamine, for example, and/or organometallic compounds such as dibutyl tin dilaurate, tin dioctoate and iron acetyl acetonate, for example, since foam plastics which generally have satisfactory to good physical properties can be produced with the aid of these activators. Unfortunately, however, the foam plastics prepared using such activators are not suitable for all industrial purposes, largely because these catalysts are not completely harmless to health nor do they fall within the relevant food regulations.

There have been many attempts to overcome such disadvantages which are largely due to the volatility of the catalysts and their tendency to migrate; for example, hydroxyl-containing tertiary amines have been used with the aim of incorporating them into the macromolecule during the polyaddition reaction. Such an expedient has yielded only limited success since the amine which is sufficiently catalytically active at the start of the polyaddition reaction and at the foaming step is no longer active when it is necessary to harden the foam product because it is substantially incorporated into the polyurethane structure by that time.

It is therefore an object of this invention to provide an activator for the preparation of polyurethanes which is devoid of the foregoing disadvantages.

Another object of this invention is to provide a material which may be used as an activator for the NCO/hydroxyl hydrogen reaction which is completely harmless to health.

A further object of this invention is to provide a process for preparing foam polyurethane plastics which are not rendered physiologically harmful due to the catalyst employed.

Still another object of this invention is to provide a polyurethane foam plastic which will meet the requirements of relevant food regulations.

A still further object of this invention is to provide a process for the production of polyurethane foams which have excellent physical properties and which are highly advantageous commercially and which have not been deleteriously affected by the activator or catalyst system employed in the preparation thereof.

The foregoing objects and other are accomplished in accordance with this invention, generally speaking, by providing a polyurethane foam plastic material containing a catalytic amount of di-n-octyl tin mercaptide. In the process of this invention a urethane-containing foam plastic is prepared by reacting an organic polyhydroxy compound with an organic polyisocyanate in the presence of water and/or other blowing agents and, if desired, other additives wherein di-n-octyl tin mercaptide is used as the activator.

It has now surprisingly been found that di-n-octyl tin mercaptide is not only an excellent activator for the production of foam plastics from polyhydroxyl compounds and polyisocyanates but that it is also completely harmless from a health point of view. Hence, the foam plastics obtained with the catalysts of this invention can be regarded as physiologically harmless and they have been found to meet the requirements of relevant food regulations. The range of application for polyurethane foams is thus extended to areas from which they have been excluded heretofore for the reasons mentioned above. In addition, the physical properties of the products of the instant process are excellent and meet commercial requirements entirely.

The di-n-octyl tin mercaptide activator of this invention has the formula

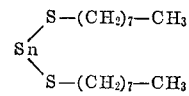

and is for example effective when employed in combination with epoxidized soya bean oil. The catalyst of this invention may also be used with advantage in combination with tertiary amines, including those which can be built into the macromolecule in many cases. Some suitable tertiary amines which can be built into the macromolecule inclde, for example, diethylethanolamine, triethanolamine, the reaction products of ammonia and ethylene diamine with alkylene oxides and so on. The disadvantage which arises when such amines are used alone as the activator is obviated when they are used in combination with the activator of this invention.

In the preparation of the polyurethane foams of this invention, active hydrogen containing compounds preferably polyhydroxy compounds, are reacted with polyisocyanates in the presence of a blowing agent. The polyhydroxyl compounds which may be used are of many different types and it is preferable to use those which have hydroxyl numbers between about 30 and 80 when soft foam materials are desired and those which have hydroxyl numbers of between about 200 and about 700 when hard foam plastic products are desired. Combinations of each type of polyol may also be used to prepare durable foam plastics having intermediate properties. Some suitable polyhydroxyl compounds which may be thus employed include, for example, those listed in Kunststoff-Handbuch, volume V11, "Polyurethane," Publishers Carl Hanser, Munich, 1966, pp. 45–73 and 511–515 and German Pat. 1,217,604, German Auslegeschrift 1,229,290 and U.S. Pat. 3,201,372.

Any suitable polyisocyanates may be used to prepare the polyurethane including aliphatic, cycloaliphatic, araliphatic and aromatic polyisocyanates such as, for example, 1,6-hexamethylene disocyanate, m-xylylene disocyanate, 1-methylcyclohexane-2,4- and -2,6-disocyanate and any mixtures of these isomers, 4,4'-diphenylmethane diisocyanate, polyphenylpolymethylenepolyisocyanates such as those obtained by aniline-formaldehyde condensation followed by phosgenation as described in U.S. Pat. 2,683,730, carbodiimide-containing polyisocyanates such as, for example, those obtained by the process described in German Pat. 1,092,007, naphthylene-1,5-diisocyanate, toluene, 2,4,6-triisocyanate, reaction products of, for example, 1 mol of a trihydric alcohol and 3 mols of a diisocyanate and the like as well as any of those listed in Canadian Pat. 698,636.

Any suitable blowing agents may be used in preparing the polyurethanes of this invention including water and/or other blowing agents such as halogenated hydrocarbons having a low boiling point. Examples of some such blowing agents are monofluorochloromethane, difluorodichloromethane, methylene dichloride and those listed in U.S. Pat. 3,201,372 and the like.

Any suitable auxiliary agents such as emulsifiers, foam stabiilzers and the like can be used in the process of this invention. Particularly suitable emulsifiers include sulphonated castor oil and particularly suitable foam stabilizers are those based on silicones including those referred to in U.S. Pat. 3,201,372.

Any catalyst amount of the catalyst of this invention may be used and quantities of from about 0.05 to about 1% by weight based on 100 parts by weight of the polyol are preferably employed.

The foam plastics of this invention may be prepared according to any of the known procedures at room temperature or at an elevated temperature, preferably by simply mixing the components together in one step although a prepolymer process may also be employed. It is also advantageous to use mechanical equipment such as that described, for example, in French Pat. 1,074,713 and U.S. Re. Pat. 24,514 for this purpose. Any suitable flame-protective agents, dyes, pigments or additives as described in U.S. Pat. 3,201,372 may also be used, and those which are physiologically harmless are preferred in order to achieve the objects of this invention.

The invention is further illustrated but is not intended to be limited by the following examples in which all parts and percentages are by weight unless otherwise specified.

EXAMPLE 1

About 100 parts of a partly branched polyether prepared from trimethylol propane and propylene oxide and having an OH number of 46 and a viscosity of 575 cp./25° C., about 37 parts of an 80:20 mixture of tolylene diisocyanate 2,4- and 2,6-isomers, about 3 parts of water and 0.3 part of triethylene diamine (1,4-diazabicyclo-(2,2,2)-octane), about 0.2 part of di-n-octyl tin mercaptide as a catalyst and about 1 part of a water soluble polysiloxane (Silicone Surfactant L–520 of Union Carbide Corp.) are mixed together in the usual manner. After this mixture is poured out, a foam is obtained which rises within one minute and which, when set, has commercially desirable physical properties.

When used in a given proportion by weight the di-n-octyl tin mercaptide catalyst of this invention has a more powerful activating effect than the heretofore employed tin dioctate catalyst. Furthermore, the polyurethane foam obtained using the mercaptide of this invention is physiologically harmless.

EXAMPLE 2

About 80 parts of a polyether prepared from trimethylol propane and propylene oxide and having an OH number of 550 and a viscosity of about 2000 cp./25° C., about 10 parts of trimethylol propane, about 20 parts of trichloroethylphosphate, about 10 parts of an amino ether of ethylene diamine and propylene oxide having an OH number of 450 and a viscosity of about 5000 cp./25° C., about 1.5 parts of a 50% aqueous solution of the sodium salt of sulphonated castor oil, about 2 parts of water-soluble polysiloxane (Silicone Surfactant L–520 of Union Carbide Corp.), about 0.5 part of di-n-octyl tin mercaptide, about 30 parts of monofluorotrichloromethane as the blowing agent and about 145 parts of polyphenylpolymethylene polyisocyanate obtained by phosgenating a polyamine mixture prepared by aniline-formaldehyde condensation containing 50 weight percent of 4,4'-diphenylmethane diisocyanate and 24 weight percent of tri- resp. tetranuclear homologues are thoroughly mixed together using a mechanical stirrer. When poured out, the mixture yields a hard foam which is non-shrinking and which sets after about 45 seconds. The foam has a bulk density of about 32 kg./m.$^3$, a compression strength of about 2.7 kg./wt./cm.$^2$ and a heat bending resistance of about 130° C. It is physiologically harmless.

EXAMPLE 3

If the reaction mixture described in Example 2 is mixed with about 145 parts by weight of a carbodiimide-containing crude diphenylmethane-4,4'-disocyanate prepared as described in German Pat. 1,092,007 instead of the polyisocyanate of Example 2, a hard foam which sets in about 30 seconds is obtained which is resistant to shrinkage, has a bulk density of about 30 kg./m.$^3$, a compression strength of about 2.0 kg. wt./cm.$^2$ and a thermal stability of about 110° C. It is physiologically harmless.

EXAMPLE 4

About 80 parts of a polyether prepared from trimethylol propane and propylene oxide and having an OH number of 550 and a viscosity of about 2000 cp./25° C., about 10 parts of triemtyhlol propane, about 20 parts of trichloroethylphosphate, about 1.5 parts of a 50% aqueous solution of the sodium salt of sulphonated castor oil, about 2 parts of a polysiloxane (Silicone Surfactant L–520 of Union Carbide Corp.), about 1.5 parts of di-n-octyl tin mercaptide, about 30 parts of monofluorotrichloromethane as the blowing agent and about 135 parts of the polyisocyanate used in Example 2 are thoroughly stirred together. After hardening, the mixture yields a tough, shrink-resistant, hard foam having a bulk density of about 32 kg./m.$^3$, a compression strength of about 2.1 kg. wt./cm.$^2$ and a heat bending resistance of about 125° C. It is physiologically harmless.

EXAMPLE 5

About 82 parts of a polyether based on propoxylated sorbitol and having an OH number of 490 and a viscosity of 8700 cp./25° C., about 1 part of 2-dimethylaminoethanol as a tertiary amine catalyst, about 1 part of di-n-octyl tin mercaptide, about 1 part of a polysiloxane (Silicone Surfactant L–520 of Union Carbide Corp.), about 40 parts of monofluorotrichloromethane and about 100 parts of a semiprepolymer which contains about 29% of NCO groups and which is prepared by reacting the tolylene diisocyanate isomeric mixture used in Example 1 with the above-mentioned polyether, are thoroughly mixed together. A tough, hard foam is obtained which has exceptionally high compression strength and which is physiologically harmless.

It is to be understood that any of the components and conditions mentioned as suitable herein can be substituted for its counterpart in the foregoing examples and that although the invention has been described in considerable detail in the foregoing, such detail is solely for the purpose of illustration.

What is claimed is:
1. A process for the preparation of a polyurethane foam which comprises reacting an organic polyhydroxy compound with an organic polyisocyanate in the presence of a blowing agent and a catalytic amount of a catalyst having the formula

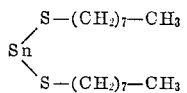

2. The process of claim 1 wherein the reaction mixture contains an hydroxyl containing tertiary amine cocatalyst.
3. The process of claim 1 wherein the reaction mixture contains from about 0.05 to about 1 percent by weight based on 100 parts by weight of the polyhydroxy compound of the catalyst.
4. The process of claim 1 wherein the reaction mixture contains epoxidized soya bean oil.

References Cited
UNITED STATES PATENTS

| | | | |
|---|---|---|---|
| 3,092,593 | 6/1963 | Nass et al. | 260—2.5 |
| 3,194,773 | 7/1965 | Hostettler | 260—2.5 |
| 3,194,770 | 7/1965 | Hostettler et al. | 260—2.5 |
| 3,476,933 | 11/1969 | Mendelsohn | 260—2.5 |

DONALD E. CZAJA, Primary Examiner

E. C. RZUCIDLO, Assistant Examiner

U.S. Cl. X.R.

260—2.5 AC, 75 NB, 77.5 AB